Jan. 30, 1923.

C. H. BEACH.
UNIVERSAL MULTIPLE SPEED GRINDER.
FILED JAN. 15, 1921.

1,443,453.

Inventor:
Chester H. Beach,
By Sheridan, Jones, Sheridan & Smith
Attys.

Patented Jan. 30, 1923.

1,443,453

UNITED STATES PATENT OFFICE.

CHESTER H. BEACH, OF RACINE, WISCONSIN, ASSIGNOR TO WISCONSIN ELECTRIC COMPANY, A CORPORATION OF WISCONSIN.

UNIVERSAL MULTIPLE-SPEED GRINDER.

Application filed January 15, 1921. Serial No. 437,562.

*To all whom it may concern:*

Be it known that I, CHESTER H. BEACH, a citizen of the United States, residing at Racine, in the county of Racine and State of Wisconsin, have invented certain new and useful Improvements in Universal Multiple-Speed Grinders, of which the following is a specification.

My invention relates to improvements in universal multi-speed grinders.

In using such grinders it is important to take the desired cut at the right speed, as accurate work depends upon a proper speed relation between the wheel and the work, otherwise there is danger of bell-mouth or taper surfaces. The grinder shown herein is equipped with a number of additional pulleys and grinding spindles, to enable the operator to change quickly the ratio of driving and driven pulleys in accordance with the diameter of the grinding wheel to be used for a particular cut. With this equipment the grinders have a speed range of from 3,600 to 50,000 revolutions per minute. With such a very high speed of rotation of the spindle and grinding wheel it is also important to avoid vibration, in order to accomplish the very accurate work of which these grinders are capable.

It is one of the objects of the invention to provide a structure wherein the motor is mounted on the supporting base independently of the housing for the grinding spindle, thereby insuring a rigid support for the spindle, unaffected by any vibration of the high speed electric motor. Other objects of the invention are to effect various detailed improvements in the structure of my Patent 1,391,039, September 20, 1921.

The drawings illustrate one embodiment of the invention.

Figure 1:
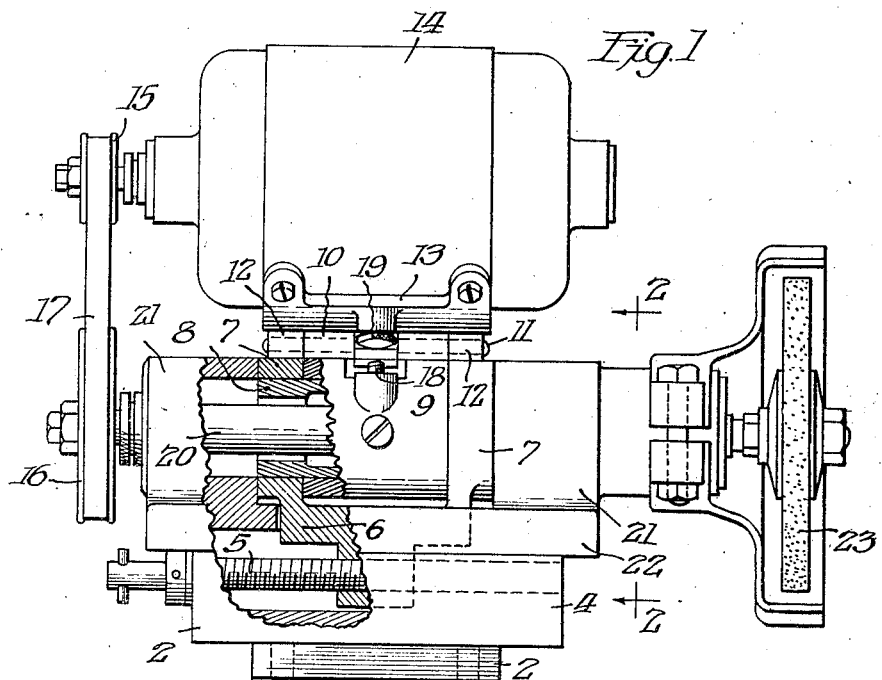
Figure 1 is a side elevation of the grinder, partly in section.

The grinder is, preferably, mounted by clamping it in the tool post of a lathe or other machine tool, and for this purpose is provided with a shank 1, pivoted to a plate 2, the latter being secured by studs to the base 4, the studs passing through elongated openings in said plate, permitting a certain relative adjustment of the parts, in the same manner as in my prior application. The base is recessed and supports a screw-threaded spindle 5, the projecting end of which is adapted to be engaged by a handle, not shown, to permit it to be rotated conveniently, thereby sliding the motor-supporting block 6 back and forth on the base plate 4, these parts having a dovetailed connection with each other, as shown more particularly in Fig. 2.

Figure 2:
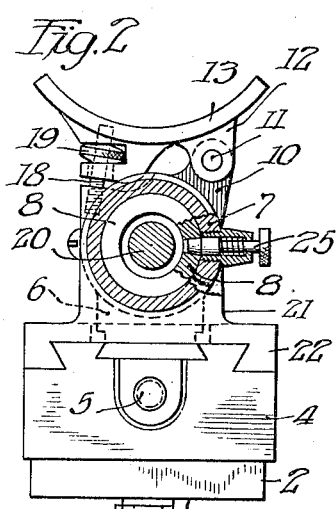
Fig. 2 is an end elevation of the grinder with the motor removed, certain parts being shown on the section line 2—2 indicated in Fig. 1.
Figure 3:
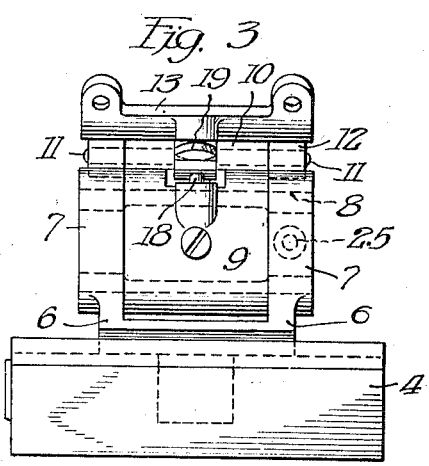
Fig. 3 is a rear elevation of the parts shown in Fig. 2.

The block 6 has a pair of circular extensions 7 at its opposite ends, which extensions receive a sleeve 8, the latter having a sliding fit therein. Said sleeve is encircled by a ring 9, having a tight fit thereon, so as to turn with it, said ring fitting between the two rings 7 and having an outer cylindrical surface of the same diameter as the ring 7, thus presenting a smooth, uniform appearance. The ring 9 has an extension 10, which supports a short rod 11, the latter constituting a pivotal support for a pair of ears 12 comprising part of a motor-supporting bracket or cradle 13, whereby the motor 14, secured in said cradle, may be adjusted about the pivoted rod 11. The motor has a removable driving pulley 15 provided on the end of its armature shaft and connected with a driven pulley 16 by a belt 17. The belt tension is regulated by a screw-threaded spindle 18 carrying a knurled nut 19, as shown in Fig. 2.

The driven pulley 16 is removably mounted on the end of a shaft 20, mounted in ball bearings (not shown) in opposite ends of cylindrical supports 21 formed integrally with a second base plate 22, and spaced from each other to receive between them the motor-supporting block 6 and its integral extension. The base plate 22 is mounted on the base 4 independently of the motor support, and has an independent dovetailed connection therewith, as shown in Fig. 2, sliding on the outer guideways, while the motor support slides on the inner guideways shown in said figure. Said base plate has a central opening through which the motor-supporting block 6 passes, and is moved back and forth when the threaded shaft 5 is turned, the circular extensions 7 bearing against the adjacent circular extensions 21 to move them in one direction or the other.

The outer end of the shaft 20 carries a grinding wheel 23, which may be of any diameter adapted to the work to be performed. The wheel shown in Fig. 1 is of maximum size, which in practice, with this particular equipment, would be about five inches. This wheel may be readily replaced, however, by any one of a number of smaller wheels, ranging, for example, from a diameter of three-sixteenths of an inch.

Figure 4:
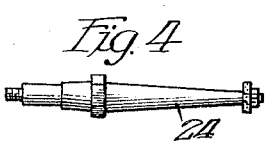
Fig. 4 is an elevation of one of the substitute grinding spindles.

For internal grinding the wheels are mounted on an extension spindle 24, such as shown, for example, in Fig. 4, said spindle being one of a number of spindles of different length which may be screwed into the end of the shaft 20. Not only may the driving pulleys 15 and 16 be reversed, so as to give a higher speed of rotation for a smaller grinding wheel, but any one of a number of different sets of pulleys may be substituted to give the desired surface speed to the particular grinding wheel being used, thereby providing a very wide range of speed for the spindles 20. The motor and its immediate support, being mounted directly on the base, independently of the mounting for the spindle, are rigidly supported, and the grinding spindle also being directly mounted on a rigid support is not affected by any slight vibration of the motor. The grinder, therefore, is adapted for very accurate work, and furthermore, the motor may be swung to any one of a number of different positions about the spindle as a center and locked in such position by the spring plunger 25, thereby avoiding interference between the motor and the work, and permitting the grinding of comparatively inaccessible surfaces.

The invention is not limited to the structural details shown herein, but may be embodied in other forms.

I claim:

1. An electric grinder comprising a base, a motor slidably mounted thereon, and a grinding spindle mounted directly on said base, slidable thereon, and belted to said motor, said spindle being located between said motor and said base.

2. An electric grinder comprising a base, a motor slidably mounted thereon, and a grinding spindle also slidably mounted on said base and belted to said motor, said motor being mounted to swing about the axis of said spindle.

3. An electric grinder comprising a base, a motor slidably mounted thereon, a grinding spindle directly mounted on said base between it and the motor, slidable on said base and belted to said motor, and a threaded shaft carried by said base for adjusting said motor.

4. An electric grinder comprising a base, having two guideways thereon, a motor, a support for the motor slidably mounted on one guideway, a grinding spindle between said motor and base, a support for said spindle also slidably mounted on the other guideway and means permitting said motor to drive said spindle.

5. An electric grinder comprising a base, a motor, a support for the motor slidably mounted on said base, a grinding spindle, a support therefor also slidably mounted on said base, means permitting said motor to drive said spindle, and means for adjusting said motor on said base, said motor support engaging said spindle support to move it when said motor is moved.

6. An electric grinder comprising a base, a threaded shaft thereon, a motor supporting block having dove-tailed engagement with said base and having threaded engagement with said shaft, said block having a pair of alined rings thereon, a sleeve fitted within said rings and a motor cradle revolubly mounted on said sleeve, a motor mounted in said cradle and a grinding spindle driven from said motor.

7. An electric grinder comprising a base, a threaded shaft thereon, a motor supporting block having dove-tailed engagement with said base and having threaded engagement with said shaft, said block having a pair of alined rings thereon, a sleeve fitted within said rings, a motor cradle revolubly mounted on said sleeve, a motor mounted in said cradle, and a grinding spindle driven from said motor, and a lock associated with said cradle for engaging said sleeve to lock the motor in different rotative positions.

8. An electric grinder comprising a base, a threaded shaft thereon, a motor supporting block having a dove-tailed engagement with said base and having threaded engagement with said shaft, said block having a pair of alined rings thereon, a sleeve fitted within said rings, a motor cradle revolubly mounted on said sleeve, a motor mounted in said cradle, a grinding spindle support also slidably mounted on said base, a grinding spindle mounted therein and passing through said sleeve and a belt connecting said motor and spindle.

9. An electric grinder comprising a base, a spindle support having dove-tailed engagement therewith, said support having a central opening therethrough, a motor support received within said opening and resting on said base independently of said spindle support, a motor on said motor support, a spindle on said spindle support and driving means connecting said motor and spindle.

10. A high speed electric grinder comprising a base, a motor adjustably mounted thereon and having an armature shaft with a removable pulley, a grinding spindle also adjustably mounted on said base independently of said motor and having a removable pulley and a driving belt, whereby said pulleys may be changed to vary the speed of said spindle and whereby said spindle is unaffected by an vibration of said motor.

In testimony whereof, I have subscribed my name.

CHESTER H. BEACH.